United States Patent
Fujino

(10) Patent No.: US 9,446,972 B2
(45) Date of Patent: Sep. 20, 2016

(54) ACTIVATED SLUDGE TREATMENT METHOD, AND METHOD FOR UPGRADING EXISTING WASTE WATER TREATMENT EQUIPMENT USING SAID METHOD

(75) Inventor: Kiyoharu Fujino, Mie (JP)

(73) Assignee: JAPAN ALSI CO., LTD., Mie (JP)

( * ) Notice: Subject to any disclaimer, the term of this patent is extended or adjusted under 35 U.S.C. 154(b) by 0 days.

(21) Appl. No.: 14/383,077

(22) PCT Filed: Mar. 7, 2012

(86) PCT No.: PCT/JP2012/055812
§ 371 (c)(1),
(2), (4) Date: Sep. 4, 2014

(87) PCT Pub. No.: WO2013/132612
PCT Pub. Date: Sep. 12, 2013

(65) Prior Publication Data
US 2015/0027947 A1    Jan. 29, 2015

(51) Int. Cl.
*C02F 3/30* (2006.01)
*C02F 3/12* (2006.01)
*C02F 3/00* (2006.01)
*C02F 101/32* (2006.01)
*C02F 103/32* (2006.01)

(52) U.S. Cl.
CPC ............... *C02F 3/121* (2013.01); *C02F 3/006* (2013.01); *C02F 3/1221* (2013.01);
(Continued)

(58) Field of Classification Search
CPC .... C02F 3/121; C02F 3/1278; C02F 3/1221; C02F 3/301; C02F 2101/32; C02F 2103/32; C02F 2209/04; C02F 2209/06; C02F 2303/06; C02F 3/006; C02F 3/1284; C02F 3/303; C02F 2303/006; C02F 2209/001; C02F 2209/10; C02F 2209/22; C02F 2209/38; C02F 2209/40; C02F 2209/42; C02F 2303/14; Y02W 10/15
USPC ................... 210/605, 614, 623, 630
See application file for complete search history.

(56) References Cited

U.S. PATENT DOCUMENTS

5,616,241 A * 4/1997 Khudenko .............. C02F 3/006
   210/151
5,989,428 A * 11/1999 Goronszy ............... C02F 3/006
   210/143
(Continued)

FOREIGN PATENT DOCUMENTS

JP        61-37299 U     3/1986
JP        04-305297 A   10/1992
(Continued)

OTHER PUBLICATIONS

Machine-generated English translation of JP 7-016589, generated on Dec. 10, 2015.*
(Continued)

*Primary Examiner* — Fred Prince
(74) *Attorney, Agent, or Firm* — Hedman & Costigan, P.C.; James V. Costigan; Kathleen A. Costigan

(57) ABSTRACT

The object is to provide an activated sludge treatment method whereby production of excess sludge is brought substantially to zero; and a method for upgrading existing waste water treatment equipment, employing this method. The method includes a step (1) in which sludge (2) produced in a sedimentation tank is supplied to a waste water aeration-conditioning tank for activated sludge treatment; a step (2) in which waste water into which the sludge (2) has been mixed is subjected to aeration-conditioning to bring the oxidation-reduction potential to a positive value, and supplied to a pressurized flotation concentration-separation tank; a step (3) in which the sludge (1) produced through treatment in the pressurized flotation concentration-separation tank is supplied to the bioreactor; a step (4) in which the treated waste water (1) separated from the pressurized flotation concentration-separation tank is supplied to a dilute activated sludge aeration tank; a step (5) in which released water and the sludge (3) produced by treatment in the bioreactor are supplied to the dilute activated sludge aeration tank; and a step (6) in which the treated waste water (2) separated from the dilute activated sludge aeration tank is supplied to the sedimentation tank.

3 Claims, 4 Drawing Sheets

(52) U.S. Cl.
CPC .......... *C02F 3/1278* (2013.01); *C02F 3/1284* (2013.01); *C02F 3/301* (2013.01); *C02F 3/303* (2013.01); *C02F 2101/32* (2013.01); *C02F 2103/32* (2013.01); *C02F 2203/006* (2013.01); *C02F 2209/001* (2013.01); *C02F 2209/04* (2013.01); *C02F 2209/06* (2013.01); *C02F 2209/10* (2013.01); *C02F 2209/22* (2013.01); *C02F 2209/38* (2013.01); *C02F 2209/40* (2013.01); *C02F 2209/42* (2013.01); *C02F 2303/06* (2013.01); *C02F 2303/14* (2013.01); *Y02W 10/15* (2015.05)

(56) References Cited

U.S. PATENT DOCUMENTS

| | | | |
|---|---|---|---|
| 2003/0201225 A1* | 10/2003 | Josse | C02F 1/56 210/605 |
| 2009/0078646 A1* | 3/2009 | Curtis | C02F 3/1215 210/605 |
| 2014/0144820 A1* | 5/2014 | Early | C02F 3/1242 210/96.1 |

FOREIGN PATENT DOCUMENTS

| | | |
|---|---|---|
| JP | 06-210297 A | 8/1994 |
| JP | 07-016589 A | 1/1995 |
| JP | 10-314712 A | 12/1998 |
| JP | 11-128987 A | 5/1999 |

OTHER PUBLICATIONS

Yasui Hidenari, Review for the Latest Sludge Treatment Technologies, Kagaku Kogaku, vol. 66, No. 6, pp. 329-331.
International Search Report in corresponding PCT application dated May 29, 2012.
English Abstract for JP 04-305297 dated Oct. 28, 1992.
English Abstract for JP 06-210297 dated Aug. 2, 1994.
English Abstract for JP 10-314712 datod 1000-12-02.

* cited by examiner

ACTIVATED SLUDGE TREATMENT METHOD, AND METHOD FOR UPGRADING EXISTING WASTE WATER TREATMENT EQUIPMENT USING SAID METHOD

TECHNICAL FIELD

The present invention relates to an activated sludge treatment method, and to a method for upgrading existing waste water treatment equipment using this activated sludge treatment method.

TECHNICAL BACKGROUND

The activated sludge treatment method is a very exceptional waste water treatment method, and is accordingly widely used for waste water treatment. Various treatment systems adapted to different types of waste water have been proposed.

In conventional activated sludge treatment methods, utilizing the natural food chain, various microbes, from soil bacteria to large protozoa, are utilized.

An example of an existing activated sludge treatment method is shown in FIG. 4.

Waste water is introduced into a waste water conditioning tank, and subjected to pre-treatment as needed, eliminating coarse to fine matter dispersed in the waste water, in a pressurized flotation tank. In the case of effluent having a high oil content, separation-flocculation using a flocculant is performed by way of a primary treatment. For example, inorganic flocculants such as aluminum sulfate (known as "aluminum sulfate, anhydrous") or polyaluminum chloride (known as "PAC"), or organic flocculants such as polyacrylamide based polymers or the like, are added to effluent to break down the emulsified state and separate the oil component and the water component. However, in such cases, a large amount of flocculant, in the form of sludge, is generated. During treatment in the pressurized flotation tank, contaminant substances contained in the waste water are removed through adhesion to the inorganic flocculant, forming floating scum and generating sludge. The sludge is collected in a waste water holding tank.

Soluble organic matter suited to microorganism treatment is fed as waste water for treatment to an aeration tank, and after aeration treatment with activated sludge, the waste water for treatment is separated from the activated sludge and released, while the separated concentrated active sludge is collected in a sludge holding tank, a portion thereof being recirculated to the aeration tank for use as return sludge.

The sludge collected in the sludge holding tank is fed to a dewatering apparatus and transformed into a dewatered cake, which is buried in landfill, or disposed of as bacterial fertilizer or through incineration.

Such activated sludge treatment methods have problems such as the following, which need to be solved.

(1) In the case of waste water containing high levels of proteins, modified proteins, cellulose-starch, fats and oils, and other such persistent substances, large amounts of dewatered cake which emits a foul odor are generated as excess sludge. To reduce the amount of excess sludge, there has been proposed a method of increasing the size of the aeration tanks and digesting for a prolonged aeration time (lagoon system, oxidation ditch). However, with this method, in cases of large loads imposed by copious amounts of waste water, an extremely large aeration tank is required, and therefore problems such as lack of a site or high construction costs may arise. Also, once bulking or a treatment anomaly has occurred, considerable expense and several days may be needed for recovery, and consistency of operations at the plant may be a problem.

(2) When performing microorganism treatments, it is necessary to bring the inflowing waste water to neutral pH. However, when chemicals are added to neutralize, in addition to outlays for the chemicals, accelerated corrosion of equipment can become a problem. Another problem is that the pH of the released treated water varies greatly when the hydrogen ion concentration (hereinafter termed pH) of inflowing waste water is regulated.

(3) With activated sludge methods, inflow of toxic substances that could render the activated sludge sterile will damage the activated sludge, which tends to give rise to a loss of waste water purifying function, or to filamentous bulking. However, as it is not possible to completely avoid the presence in waste water of low levels of bactericides or substances having adverse effects on activated sludge, elimination of such harmful substances is a problem.

(4) In activated sludge treatment plants in which large volumes of organic contaminant substances are treated, the following problem may occur. The inflow of water decreases greatly at night and on non-working days. In cases of numerous consecutive non-working days, the good activated sludge microbes are not supplied with a constant amount of contaminant substances, and are reduced in number due to excessive aeration. Further, the sludge breaks up due to the excess load. As a result, stable growth of activated sludge microbes cannot be assured, and bulking or sludge flotation may arise, which tends to reduce the treatment power of the activated sludge. Particularly in cases in which there are large fluctuations in contaminant substance component levels in inflowing waste water for treatment, or in cases in which the load increases sharply due to consecutive non-working days, bulking is prone to occur. To prevent this, larger waste water conditioning tanks may be constructed, storing large quantities of waste water in the hopes of achieving uniform quality of the waste water, which is then continuously supplied at a constant supply rate to the aeration tank; however, problems relating to restrictions of the size of the area of the site and construction costs may be encountered.

(5) The high-speed aeration activated sludge treatment method is a highly efficient waste water treatment method requiring a minimal installation area. However, as the process is a completely mixed system in which the activated sludge and the waste water are constantly present together, the problem of bulking due to filamentous bacteria tends to arise. Moreover, as sewage treatment facilities, such systems are typically classed as secondary treatment facilities, and in recent years facilities that are incapable of adequate treatment have largely disappeared.

In order to solve the above described problems, the inventors previously developed a bioreactor and a waste water treatment method (see Patent Document 1), and achieved good results in waste water treatment in numerous fields.

Moreover, as one method for reducing excess sludge, there has been disclosed a method involving returning excess sludge to the aeration tank after ozone treatment (Non-patent Document 1). Other known methods involve treatment with thermophiles, mechanical crushing, or chemical treatment, followed by return to the aeration tank.

However, as waste water treatments become increasingly diverse, regulations with respect to the environmental load become more stringent, and in some cases it proves difficult to minimize excess sludge, despite performing waste water treatment by the various methods mentioned above.

Another problem is that with existing waste water treatment facilities employing conventional methods, the waste water treatment equipment installation sites are quite large in area, making activated sludge treatment insufficient, whereby large amounts of excess sludge are generated.

PRIOR ART DOCUMENT

Non-Patent Document

Non-patent Document 1: YASUI, Hidenari, Kagaku Kogaku, Vol. 66, No. 6, pp. 329-331, 2002

Patent Document

Patent Document 1: Japanese Patent Publication No. 4142138

SUMMARY OF THE INVENTION

Problem to be Solved by the Invention

The present invention was devised in order to solve the above mentioned problems, and has as an object to provide a waste water treatment method employing an activated sludge treatment method, wherein the activated sludge treatment method reduces production of excess sludge substantially to zero; as well as a method for upgrading existing waste water treatment facilities using this activated sludge treatment method.

Means to Solving the Problem

The activated sludge treatment method of the present invention is an activated sludge treatment method for treatment of waste water by a circulation system equipped with a waste water aeration-conditioning tank, a pressurized flotation concentration-separation tank, a dilute activated sludge aeration tank, a bioreactor, and a sedimentation tank, sludge being circulated among the tanks, the method characterized by having:

a step 1 in which sludge 2 produced in the sedimentation tank is supplied to the waste water aeration-conditioning tank supplied with waste water prior to treatment;

a step 2 in which waste water into which the sludge 2 has been mixed is subjected to aeration-conditioning in the waste water aeration-conditioning tank, to bring the oxidation-reduction potential (hereinafter "ORP") to a positive value, and the conditioned waste water is then supplied to the pressurized flotation concentration-separation tank;

a step 3 in which the sludge 1 produced through treatment in the pressurized flotation concentration-separation tank is supplied to the bioreactor;

a step 4 in which the treated waste water 1 separated from the pressurized flotation concentration-separation tank is supplied to the dilute activated sludge aeration tank;

a step 5 in which released water and the sludge 3 produced by treatment in the bioreactor are supplied to the dilute activated sludge aeration tank; and a step 6 in which the treated waste water 2 separated from the dilute activated sludge aeration tank is supplied to the sedimentation tank.

The method is further characterized in that the sludge 2 supplied to the waste water aeration-conditioning tank is supplied in a range such that the sludge concentration within the waste water aeration-conditioning tank, expressed as the mixed liquor suspended solids (hereinafter "MLSS") is 500-8,000 mg/L.

The bioreactor employed in the activated sludge treatment method of the present invention is equipped with an outer tank, a cylindrical inner tank situated in the interior of the outer tank and having openings at top and bottom, a circulation rate control device provided in an upper part of the cylindrical inner tank, and adapted for controlling the rate of circulation of treated water inside the tank, a cylindrical control plate provided to the outside perimeter in an upper part of the cylindrical inner tank, and adapted for inducing sedimentation of the sludge, treated water quality measurement devices provided outside and inside of the cylindrical inner tank, a waste water supply port provided to a circulation pathway of the treated water circulated within the outer tank and the inner tank, and a treated water release port provided to an upper part of the outer tank.

The cylindrical inner tank constituting the bioreactor is divided, by a partitioning wall having a passage hole in a center part, into a cylindrical top part and a cylindrical bottom part, with the cylindrical top part constituting an aerobic microorganism treatment tank having an opened conical trapezoidal-shaped part at the top face and the bottom face and provided with a plurality of air injection ports in a peripheral edge part of the partitioning wall and surrounding the passage hole within the cylindrical top part, and the cylindrical bottom part constituting an anaerobic microorganism treatment tank having an open part at the bottom face, and is provided with stirring devices for respectively stirring the aerobic microorganism treatment tank and the anaerobic microorganism treatment tank.

The bioreactor is provided with means for detecting at least one measured value, selected from the pH, the oxidation-reduction potential (hereinafter "ORP"), and the dissolved oxygen (hereinafter "DO") content of the treated water measured by the treated water quality measurement devices, and with means provided to the circulation rate control device according to the detected measured value, and adapted for controlling the rate at which water circulates within the tank to 3-20, through control of at least one quantity selected from opening-closing of a fluid level adjustment valve, vertical movement of a fluid level adjustment control panel, and the quantity of air blown in from the air injection ports. Herein, the circulation rate of treated water within the reaction tank is a quantity defined by the following expression.

Treated water circulation rate=quantity of treated water discharged from inner tank upper part ($m^3$/day)/waste water supply quantity ($m^3$/day)

The method is further characterized in that in the bioreactor, anaerobic microorganism treatment and aerobic microorganism treatment take place in successive fashion through circulation of activated sludge, together with waste water supplied from the waste water supply port, within the tank, through the interior of the cylindrical inner tank, the outside peripheral face of the cylindrical inner tank, and within activated sludge that has sedimented to a bottom part of the outer tank.

In particular, the method is characterized in that the waste water supply port is constituted by a plurality of discharge ports or slits provided to a ring-shaped waste water supply part situated in a bottom part of the opening part of the anaerobic microorganism treatment tank. The method is further characterized in that the cylindrical bottom part has a capacity that is 1/10 to 1-fold the capacity of the cylindrical top part.

The method for upgrading existing waste water treatment according to the present invention is an upgrading method for reducing sludge produced by waste water treatment equipment, to a lower level than sludge produced by the existing waste water treatment equipment, wherein the upgrading method is characterized by including a step in which the above described bioreactor 3 is newly equipped with an existing or upgraded pressurized flotation concentration-separation tank and dilute activated sludge aeration tank, and a circulation step in which sludge is circulated according to the above described activated sludge treatment method of the present invention, via the newly installed bioreactor.

Effect of the Invention

The method of the present invention provides an activated sludge treatment method whereby sludge produced respectively in a pressurized flotation concentration-separation tank, activated sludge aeration tank, and bioreactor employed as waste water treatment equipment, is circulated among the tanks by the method according to claim 1, while a portion of the sludge produced by the activated sludge aeration tank is supplied to the waste water aeration-conditioning tank for waste water undergoing activated sludge treatment, whereby substantially no excess sludge is discharged.

By newly providing the bioreactor according to claim 3, it is possible for upgraded existing waste water treatment equipment to carry out waste water treatment with substantially no discharge of excess sludge.

MODE FOR CARRYING OUT THE INVENTION

Figure 1:
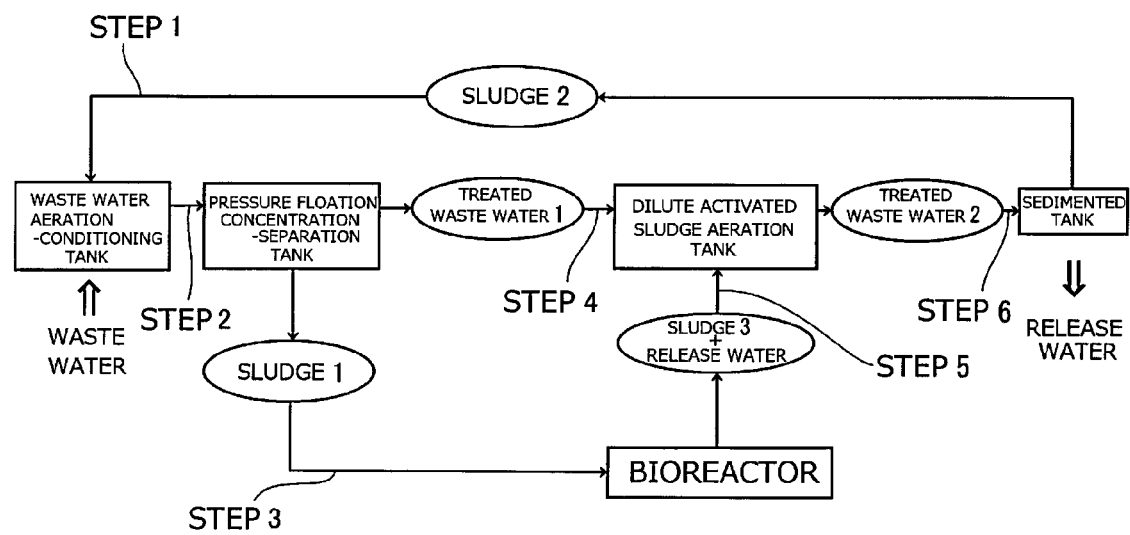
FIG. 1 is a block diagram of an activated sludge treatment method.

A block diagram of an activated sludge treatment method of the present invention is shown in FIG. 1.

Sludge 1, sludge 2, and sludge 3 which are produced respectively in a pressurized flotation concentration-separation tank, a dilute activated sludge aeration tank, a bioreactor, and a sedimentation tank are circulated over a pathway shown respectively by steps 1 to 5. In the course of being circulated, the sludge is digested, and substantially no excess sludge is discharged. The steps are described in order below.
Step 1:
Step 1 is a step in which the sludge 2 produced by the sedimentation tank is supplied to the waste water aeration-conditioning tank for the waste water which is undergoing activated sludge treatment.

In the case of upgrading existing waste water treatment equipment, the waste water aeration-conditioning tank is obtained by retrofitting the existing waste water tank with air injection equipment.

Large solids present in treated waste water are removed by a screen or the like, and the treated waste water is collected in the waste water aeration-conditioning tank. This waste water aeration-conditioning tank is supplied with the sludge 2 produced in the sedimentation tank, which is mixed with the waste water through agitation, whereupon persistent substances, toxic substances that could break down the activated sludge, and other such contaminant substances in waste water that could give rise to anomalies in activated sludge treatment are adsorbed through contact with the sludge 2. Because this sludge 2 is has been treated in the dilute activated sludge aeration tank and passed through the sedimentation tank, the sludge contains activated sludge microbes suited to the waste water being treated. Therefore, by supplying the sludge 2 to the waste water, damage to the activated sludge in the dilute activated sludge aeration tank is prevented, and the sludge can be maintained in a state of high activity, whereby the occurrence of anomalous phenomena during treatment due to bulking of the dilute activated sludge or to foaming scum can be reduced, making treatment more consistent.

The sludge 2 supplied to the waste water aeration-conditioning tank is supplied at a sludge concentration, expressed as MLSS in the waste water aeration-conditioning tank, within a range of 500-8,000 mg/L, and preferably supplied within a range of 1,000-5,000 mg/L. When the MLSS is less than 500 mg/L, contaminant substances having adverse effects on the activated sludge cannot be adsorbed by the sludge 2, and therefore activated sludge treatment becomes inconsistent. When the MLSS exceeds 8,000 mg/L, the sludge 2 adsorbs substantially all contaminant substances, reducing the biological oxygen demand (hereinafter "BOD") contained in the treated waste water.
Step 2:
Step 2 is a step in which the waste water into which the sludge 2 has been mixed undergoes aeration-conditioning in the waste water aeration-conditioning tank, to bring the ORP of the waste water to a positive value, and the waste water is then supplied to the pressurized flotation concentration-separation tank. Through aeration-conditioning to a positive value, activated sludge treatment to oxidize hydrogen sulfide, ammonia, mercaptans, and other compounds that cause foul odors, substantially eliminating odors, can be accomplished.

Aeration treatment in the waste water aeration-conditioning tank involves aeration treatment for a waste water residence time of 3 hours or more, and preferably 5 hours or more. The waste water having undergone aeration treatment in the presence of the sludge 2 and containing sludge is then supplied to the pressurized flotation concentration-separation tank.
Step 3:
Step 3 is a step in which the sludge 1 produced through treatment in the pressurized flotation concentration-separation tank is supplied to the bioreactor. Here, the sludge 1 is not dry sludge, but liquid sludge containing water.

As the waste water supplied to the pressurized flotation concentration-separation tank has undergone aeration treatment in the waste water aeration-conditioning tank, the pH has been regulated in a natural manner due to the pH buffering action of the microbes, therefore obviating the need for chemicals and equipment to neutralize acids or bases. For this reason, not only can the site be used effectively, but treatment can be accomplished without chemical dosing, thereby saving on chemical costs.

Even when toxic substances, such as bactericides or the like, that can break down activated sludge when adsorbed by activated sludge are present in the waste water, these are adsorbed beforehand by the sludge 2, and are removed from the system as the sludge 1 through pressurized flotation, and therefore have no adverse effects on the activated sludge in the dilute activated sludge aeration tank, whereby activated sludge treatment can be carried out in a consistent manner even when the waste water contains admixed bactericides.

Step 4:

Step 4 is a step in which the treated waste water 1 separated from the pressurized flotation concentration-separation tank is supplied to the dilute activated sludge aeration tank for treatment.

As the dilute activated sludge aeration tank, an aerobic activated sludge treatment tank employed in existing activated sludge treatment methods can be utilized without modification.

The dilute activated sludge aeration tank is supplied with the treated waste water 1, and with the sludge 3 produced in the bioreactor, shown in Step 5. This sludge 3 is digested sludge which has been digested through aeration with oxygen-containing gas for 1 to 7 days in the dilute activated sludge aeration tank.

Step 5:

Step 5 is a step in which the sludge 3 produced through treatment in the bioreactor is supplied to the above mentioned dilute activated sludge aeration tank.

In the present invention, anaerobic treatment refers to treatment conducted in a state in which the DO is less than 0.05 mg/L, and aerobic treatment to treatment conducted in a state in which the DO is 0.05 mg/L or above, preferably 0.1 mg/L or above, and more preferably 0.2 mg/L or above. It further refers to operations involving treatment in which the ORP during anaerobic treatment is less than −80 mV, and the ORP during aerobic treatment is −80 mV or above, and preferably positive.

In the bioreactor, the sludge 1 is digested anaerobically and aerobically, whereby substantially all of the contaminant substances adsorbed by the sludge 1 are decomposed and converted to carbon dioxide gas, water, or gases such as nitrogen gas, methane gas, and the like. Additionally, the sludge 1 is used for microorganism growth, becoming digested sludge having substantially undergone conversion to microbes, thereby greatly reducing the amount of sludge. Even when very minimal amounts of sludge have been produced, the flocculating and dewatering properties of the sludge are good, and the amount of dewatered cake produced can be greatly reduced, due to the reduced water content of the dewatered cake.

The dewatered cake obtained thereby is a dewatered cake of the sludge 3 which is obtained in mature microbe form, whereby the dewatered cake has low water content and reduced emission of foul odors, and can be disposed of in landfills, which involve low sludge treatment costs.

The bioreactor can be constituted by two tanks, an anaerobic bioreactor for the concentrated sludge, and an aerobic bioreactor, for example, one of larger internal capacity than the anaerobic bioreactor.

Here, the anaerobic bioreactor may be any tank in which activated sludge can be treated under anaerobic conditions. The aerobic bioreactor is an activated sludge treatment tank generally identical to the above described activated sludge aeration tank, and may be supplied with gas containing oxygen, as needed.

The amount in which the sludge 3 produced in the aerobic bioreactor is supplied to the dilute activated sludge aeration tank is an amount derived on a concentration conversion basis, such that the amount of dry sludge solids contained in the sludge 3 is substantially equal to the amount of dry solids of the reacted sludge contained in the dilute activated sludge aeration tank, maintaining the amount of sludge in the dilute activated sludge aeration tank at a constant level. To cite one example, in a case in which reacted sludge of 6,000 mg/L concentration contained in the dilute activated sludge aeration tank has been supplied at a rate of 1 $m^3$/hour, the sludge 3 of 22,000 mg/L concentration would be supplied at a rate of 0.27 $m^3$/hour. However, in cases in which the amount of water entering the dilute activated sludge aeration tank is small, the sludge 3 would be supplied in an amount 20-200% of normal.

Figure 2:
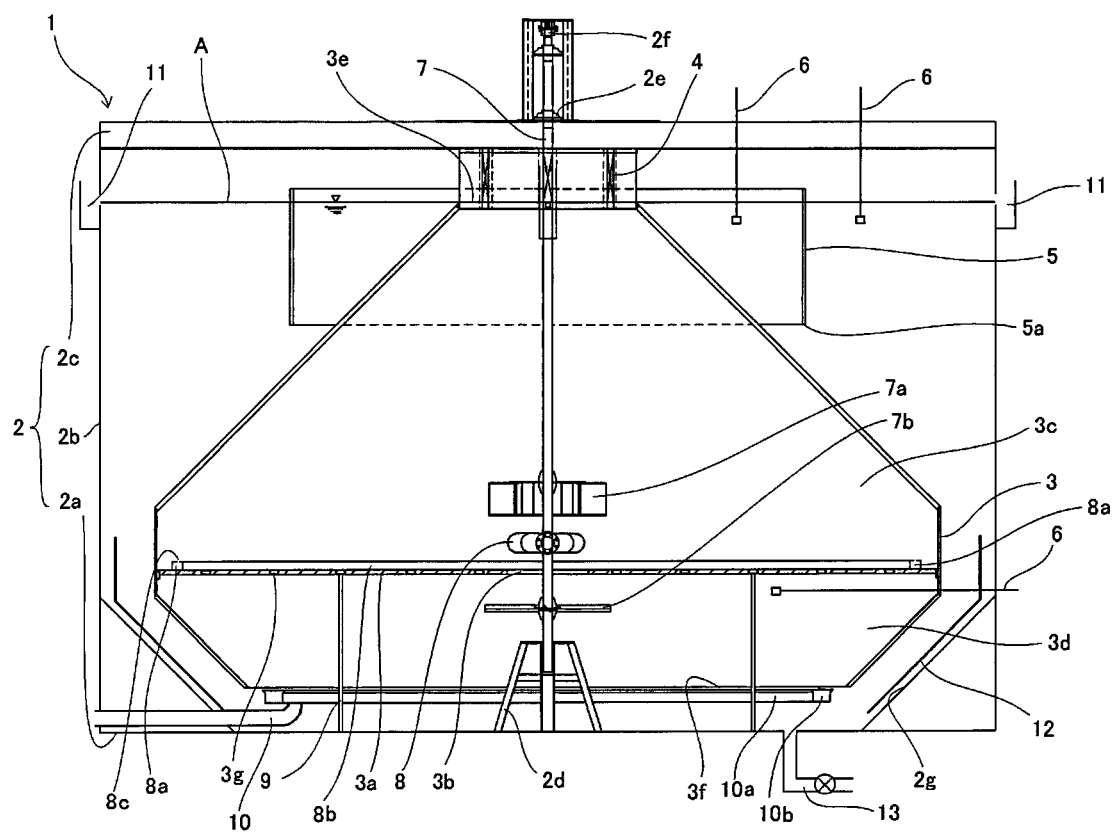
FIG. 2 is a cross sectional view of a bioreactor.

The bioreactor is shown in FIG. 2. FIG. 2 is a cross sectional view of the bioreactor.

The bioreactor 1 is constituted by an outer tank 2, a cylindrical inner tank 3 situated in the interior of the outer tank 2, a circulation rate control device 4 provided in an upper part of the cylindrical inner tank 3, a cylindrical control plate 5 provided to the outside perimeter of the cylindrical inner tank 3, treated water quality measurement devices 6, and a sludge extraction port 13.

The outer tank 2 has an external appearance of circular cylindrical form, including a base panel 2a constituting the bottom face, a cylindrical side face 2b, and an upper face part 2c. The center of the cylinder is provided with a rotating shaft 7 for attachment of an agitator paddle or the like. This rotating shaft 7 is rotatably secured by a cradle 2d provided at the center of the base panel 2a, and a bearing 2e provided at the center of the upper face part 2c. The rotating shaft 7 is rotated by a drive device 2f. The upper face part 2c rotatably fastens the rotating shaft 7, as well as retaining the cylindrical inner tank 3 by retainers or the like.

The bottom part of the outer tank 2 is provided with a waste water supply port 10. The waste water supply port 10 is constituted by a plurality of discharge ports 10b or slits provided to a ring-shaped waste water supply part 10a situated below a lower opening part 3f of the cylindrical inner tank 3. With the waste water supply port 10 arranged in this way, the anaerobic sludge may be sufficiently stirred. The waste water supply port 10 may be provided at another location on the circulation pathway for the treated water, other than the lower part of the cylindrical inner tank 3.

A treated water release port 11 for the purified water is provided in the upper part of the outer tank 2, and a sedimentation-solidification prevention device 12 for preventing sedimentation-solidification of sedimented sludge is provided to an inside face of the outer tank.

As examples of the sedimentation-solidification preventing device, there may be cited: (1) a vibrating device provided to the inner wall or outer wall of a bottom part of the outer tank in which sludge sedimentes; (2) a device having a vibrating plate provided near the inner wall, and a vibration generator provided to an upper part of the outer tank, for transmitting vibration to the vibrating plate; (3) a scraper provided to the inner wall of a bottom part of the outer tank in which sludge sedimentes; (4) an stirring flow producing device for producing a sludge-stirring flow along the inner wall of a bottom part of the outer tank, in particular, a moveable fluid jet nozzle for jetting a fluid while moving along a sloped face of the inner wall, or jet nozzles secured at prescribed intervals to a sloped surface of the inner wall; or (5) a pump for suctioning sludge that has sedimented into a bottom part of the outer tank, and expelling it into the anaerobic microorganism treatment tank, while the stirring flow producing device moves across the bottom face or sloped face of the inner wall, or pumps secured at prescribed intervals to the bottom face or sloped face of the inner wall, for suctioning sludge that has sedimented into a bottom part of the outer tank, and expelling it into the anaerobic microorganism treatment tank; or the like.

The cylindrical inner tank 3 is situated within the outer tank provided with the above described sedimentation-solidification prevention device 12.

The cylindrical inner tank 3, the lateral cross section of which is approximately circular, is divided by a partitioning wall 3a into a cylindrical top part 3c and a cylindrical bottom part 3d. A passage hole 3b through which the cylindrical top part 3c and the cylindrical bottom part 3d communicate is formed in the center of the partitioning wall 3a.

Due to the presence of the partitioning wall 3a, even in cases in which the bioreactor has a large capacity, the cylindrical top part 3c and the cylindrical bottom part 3d are sufficiently separated, and activated sludge treatment can be performed within the respective tanks. An aerobic microorganism treatment reaction can be performed sufficiently within the cylindrical top part 3c, and an anaerobic microorganism treatment reaction can be performed sufficiently within the cylindrical bottom part 3d, respectively. In cases in which the partitioning wall 3a has a large surface area, it is reinforced by a support member 3g or the like.

The passage hole 3b has a diameter of a size such that activated sludge having undergone anaerobic microorganism treatment can move from the cylindrical bottom part 3d into the cylindrical top part 3c which is the aerobic microorganism treatment tank. The diameter of the passage hole 3b will be regulated according to factors such as the capacity of the bioreactor, the quality and amount of waste water being treated, and the like.

The cylindrical top part 3c has a opened conical trapezoidal-shaped part at the top and bottom faces. That is, the shape is one in which the distal end of the cylindrical part constricts in diameter at a predetermined angle in the height direction. The slope angle of a cross section in the height direction passing through the center of the conical trapezoidal shape is from 40 to 60 degrees, and preferably 45 degrees. By adopting a slope angle within this range, sludge contained in treated water discharged from the upper part of the aerobic tank flocculates readily by flowing down along the outer face of the conical trapezoidal shape, making rapid forced sedimentation possible. Due to flocculation of the sludge, the sludge and the purified treated water are readily separated.

The cylindrical top part 3c is an aerobic microorganism treatment tank provided in the interior with air injection ports 8 and 8a. The air injection ports 8 are provided around the center shaft 7, and surrounding the passage hole 3b, and can be secured onto the partitioning wall 3a by support posts or the like, not illustrated. The air jet holes of the air injection ports 8 are preferably situated facing downward, so as to be able to contribute to agitation of the treated water and sludge within the aerobic tank.

The air injection ports 8a can be constituted by a plurality of air holes 8c provided to an air injection part 8b, the air injection part 8b being ring-shaped in plan view and situated in a peripheral edge part of the partitioning wall inside the cylindrical top part 3c, or by slits formed in the upper face or side face of the air injection part 8b.

The circulated amount of treated water can be varied within a range of 3-20 without the use of a circulating pump, by controlling the amount of air injected from the air injection ports 8 and 8a and the control quantity of the circulation rate control device, discussed below. In so doing, aerobic microorganism treatment under appropriate nitrification conditions, and anaerobic microorganism treatment under appropriate denitrification conditions, can be easily established. Further, solid-liquid separation of sludge through the principle of forcible sedimentation at the outside peripheral face of the aerobic microorganism treatment tank having the above mentioned slope angle proceeds in extremely efficient fashion, whereby the aerobic and anaerobic microorganism treatment reactions can be performed efficiently within the same tank of upright design.

Additionally, an alkali supply port or a supply for acid, omitted from the illustration, can be provided within the aerobic tank.

The cylindrical bottom part 3d is an anaerobic microorganism treatment tank having a capacity, for example, that is 1/10 to 1-fold the capacity of the cylindrical top part. When the capacity is within this range, aerobic microorganism treatment reactions and anaerobic microorganism treatment reactions of waste water containing, for example, contaminant substances that contain high concentrations of nitrogen, can be performed efficiently. The interior of the anaerobic microorganism treatment tank can be provided with a denitrifying microbe nutrient supply port, omitted from the illustration.

In cases in which there are few hydrogen donors in the waste water, and denitrification of the nitrogen in nitrates is carried out by supplying hydrogen donors such as methanol, acetic acid, or the like, it is preferable for the capacity of the anaerobic microorganism treatment tank to be larger than that of the aerobic microorganism treatment tank.

The shape of the cylindrical bottom part 3d is a shape having in the cylindrical bottom part thereof an inverted conical trapezoidal shape having an opening 3f larger in area than the opening 3e of the cylindrical top part 3c. That is, the shape is one in which the distal end of the cylindrical part constricts in diameter at a prescribed angle in the direction of the lower part. By adopting a large area for the opening 3f, the sludge inside the anaerobic microorganism treatment tank can be readily stirred.

In cases in which the above described inverted conical trapezoidal shape is adopted as the shape of the cylindrical bottom part 3d, it is preferable to adopt the same angle as the above described prescribed angle for the inner face 2g of the lower part of the outer tank 2, as sedimentation-solidification of sludge can be prevented by doing so.

The cylindrical inner tank 3 is provided with an agitator device for the purpose of bringing about sufficient treatment reaction of the treated water and the activated sludge in the cylindrical top part 3c, which constitutes the aerobic microorganism treatment tank, and the cylindrical bottom part 3d, which constitutes the anaerobic microorganism treatment tank.

The agitator device is preferably constituted by agitator paddles 7a, 7b secured to the rotating shaft 7 which has been attached at the center of the cylindrical inner tank 3. The agitator paddle 7a is preferably a turbine paddle provided inside the cylindrical top part 3c, and adapted to bring about sufficient aerobic microorganism treatment reaction. Apart from a turbine paddle, an agitator of any shape can be used, provided that mixing of air and water can take place at a relatively low rotation speed such that there is no appreciable decline in the aeration capability, according to the air injection amount.

The agitator paddle 7b is a propeller paddle provided inside the cylindrical bottom part 3d, and able to bring about a sufficient anaerobic microorganism treatment reaction.

The partitioning wall 3a provided within the cylindrical inner tank 3 is supported by a support post 9 secured rising up from the base panel 2a which constitutes the bottom face of the outer tank 2.

The cylindrical inner tank 3 is retained within the outer tank through the support provided by this support post 9, and through supports which bridge the upper part of the outer tank 2.

The circulation rate control device 4 for controlling the rate of circulation of treated water inside the reaction tank is provided in the upper part of the cylindrical inner tank 3. Control of the rate of circulation of treated water inside the reaction tank by the circulation rate control device 4 is specifically accomplished through opening and closing of a fluid level regulator valve, or up and down movement of a fluid level regulator plate, or the like. When the fluid level regulator valve is fully open, or when the level regulator plate is at the lowest position, the water level of the treated water reaches its lowest level. This water level is denoted by "A."

Control of the circulation rate within the reaction tank can also be accomplished through control of the amount of air injected by the air injection port 8 and/or 8a. The circulation rate increases as greater amounts of air are injected. A combination of opening and closing of the fluid level regulator valve and regulation of the amount of air injection can be employed as well.

In association with larger scale of the anaerobic microorganism treatment tank and the anaerobic microorganism treatment tank, the aeration air alone may no longer suffice to maintain the necessary circulation flow rate of the sludge, and in some instances adverse effects may be produced by injection of excess air. In anticipation of such cases, it is necessary to provide the air injection ports denoted by 8a in FIG. 2. The advantage is that the regulation of the air injection amount and ORP is dramatically easier, due to the air injection ports 8a which have poor aeration efficiency. The air injection ports 8a are constituted, for example, by installing the air injection part 8b of ring shape in plan view, centered on the agitator paddle 7a in the aerobic section at the upper face of the partitioning wall 3a and communicating with an external blower or the like, and providing the air injection part 8b with holes or slits. This not only increases the amount of air injection; a baffle effect arises on the part of the agitator paddle 7a as well, giving rise to a synergistic effect through efficient agitation.

Through opening and closing of a fluid level regulator valve and/or regulation of the amount of air injection, the circulation rate of the treated water can be varied without the use of a pump. As discussed below, denitrification, dephosphorization, and the like are accomplished by circulating the treated water from the aerobic microorganism treatment tank 3c past the cylindrical control plate 5 situated outside this tank and into the anaerobic microorganism treatment tank 3d, and then from the anaerobic microorganism treatment tank 3d into the aerobic microorganism treatment tank 3c. Consequently, through control of the treated water circulation rate on the basis of a prescribed control program in response to detected values, denitrification, dephosphorization, and the like can take place in optimal fashion.

The cylindrical control plate 5 is situated at the outside periphery of the upper part of the cylindrical inner tank 3. The cylindrical control plate 5 is constituted by a cylinder which is open at the top face and the bottom face, the bottom face 5a of the cylindrical control plate 5 being situated in proximity to the sloped face of the cylindrical inner tank 3. In the sloped face section situated in proximity thereto, there is formed a sludge sedimentation part where sludge concentration takes place, together with separation of treated water. This proximal situation of the bottom face 5a also makes possible rapid forcible sedimentation of sludge. In preferred practice, the distance of the bottom face 5a with respect to the sloped face of the cylindrical inner tank 3 can be adjusted. The shape of the cylindrical control plate 5 may be a vertical cylindrical shape in which the open faces at the top face and the bottom face have identical area, or an inverted conical trapezoidal shape in which the opening area of the top face is larger than the opening area of the bottom face.

The treated water quality measurement devices 6 are provided inside and outside the cylindrical inner tank 2, within the bioreactor. The treated water quality measurement devices 6 are devices for measuring the pH, ORP, and DO of the treated water.

The treated water circulation rate within bioreactor is 3-20, and preferably 5-20. When the treated water circulation rate is less than 3, the aerobic microorganism treatment reaction proceeds more readily, whereas in excess of 20, the balance between the aerobic microorganism treatment reaction and the anaerobic microorganism treatment reaction is lost, and denitrification and dephosphorization of the waste water can no longer take place. That is, by setting the treated water circulation rate to within this range, the ORP of the treated water as measured by the treated water quality measurement devices can be maintained at −10 mV or less, preferably −50 mV or less, in the anaerobic microorganism treatment tank, and at +10 mV or above, preferably +100 mV or above, in the aerobic microorganism treatment tank. As a result, the aerobic microorganism treatment reaction and the anaerobic microorganism treatment reaction take place sufficiently, with denitrification and dephosphorization taking place in successive fashion. Under these conditions, the pH in the aerobic microorganism treatment reaction tank is within the range 4.5-8.5, and preferably 5.5-7.5.

The wastewater treatment method employing the bioreactor 1 has the following exceptional features, as compared with conventional waste water treatment methods.

The conventional waste water treatment methods are methods in which waste water and return sludge are mixed in constant proportions and flowed into an aeration tank, the return sludge in contact therewith at that time and the waste water being pushed to flow until the treated water and the sludge are separated in the sedimentation tank constituting the next step.

The waste water treatment method employing the bioreactor 1 is a method in which a circulating flow of vertically circulating activated sludge is formed, and the waste water is added into this circulating flow. No circulating pump is used to create the circulating flow of activated sludge; rather, a rising flow produced by the aeration air used for microorganism treatment is utilized to form the circulating flow of sludge, thereby providing an energy-saving waste water treatment method. Furthermore, the treatment method is one in which aeration in the aerobic microorganism treatment tank is carried out efficiently.

The location for addition of the waste water may be any point on the pathway of the circulating flow, preferably the aerobic microorganism treatment tank. The anaerobic microorganism treatment tank is still more preferable. In the case of treatment employing a circulating flow in the wastewater treatment method of the present invention, even for waste water having a BOD of at least 800 mg/L and total nitrogen (hereinafter "T-N") of 40 mg/L or above, the BOD of the treated water is typically very low (20 mg/L or less), and operation is typically possible at a water quality such that the BOD of the released water is 10 mg/L or less.

When waste water is added to the sludge setting section on the circulating flow pathway formed at the outside peripheral face of the cylindrical inner tank constituting the aerobic microorganism treatment tank, there will be insufficient contact between the sludge and the waste water, and in some cases contaminant substances may not be sufficiently absorbed. In such cases, there are cases in which contaminant substances in a portion of the untreated waste water become admixed into the treated water, with adverse effects on the treated water. However, in cases in which standards for water quality are less stringent, for example, in primary treatment equipment applications, such as sewage line release water or the like having a BOD of 300 mg/L or less, or of 600 mg/L or less, there are cases in which waste water can be added to the sludge setting section on the circulating flow pathway.

Figure 3:
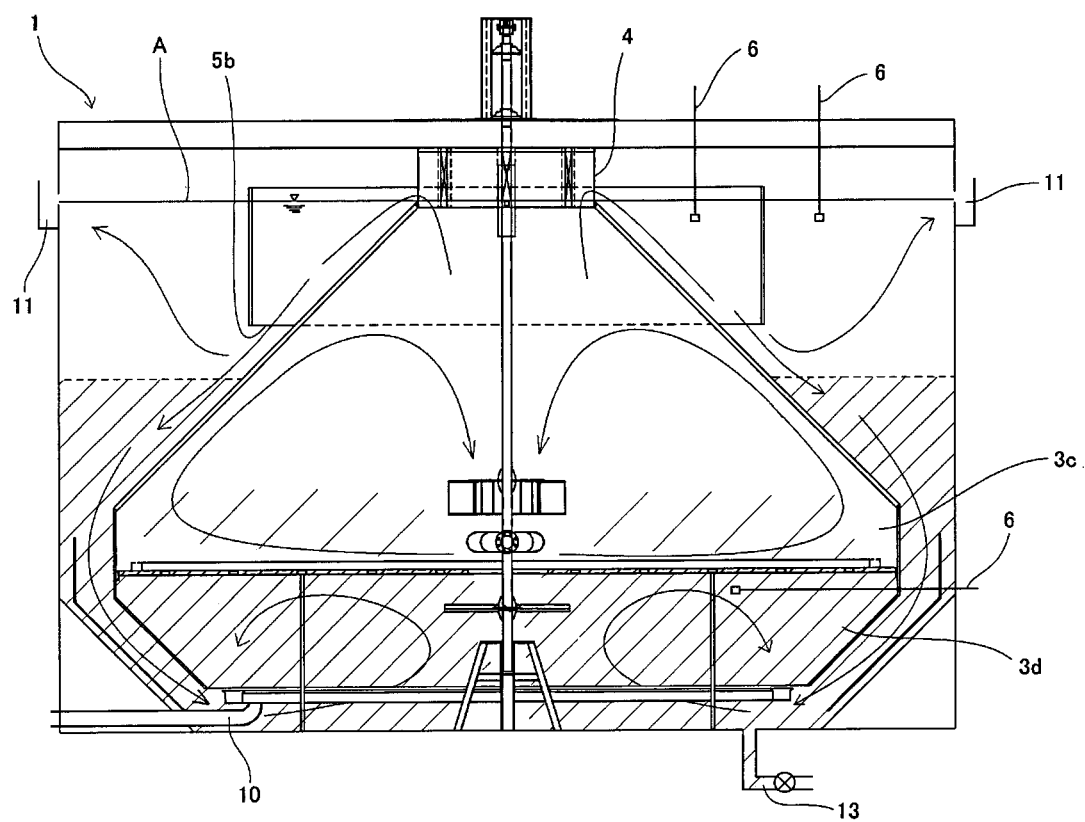
FIG. 3 is a diagram showing a circulation pathway of treated water and activated sludge in a bioreactor.

Circulation of treated water and activated sludge in the bioreactor 1 is described below using FIG. 3. FIG. 3 is a drawing showing the circulation pathway of treated water and activated sludge in the bioreactor 1. In FIG. 3, hatched sections indicate sections of high activated sludge concentration, and the arrows represent directions of circulation of the treated water and activated sludge.

The bioreactor 1 contains 5,000-12,000 mg/L (solids conversion) of activated sludge, and the waste water 1 for treatment is first brought into contact under anaerobic conditions with the activated sludge in the cylindrical bottom part 3d, whereupon a denitrification reaction takes place. The waste water 1 for treatment supplied by the waste water supply port 10 and the circulating activated sludge are circulated within the cylindrical bottom part 3d through rotation of the agitator paddle or jetting of air from a diffuser tube, bringing about an anaerobic microorganism treatment reaction.

Next, the waste water and the activated sludge move through the passage hole 3b into the cylindrical top part 3c into which air is injected, and while in contact with the activated sludge under aerobic conditions, are circulated within the cylindrical top part 3c through rotation of the agitator paddle or jetting of air from the air injection port, whereupon a nitrification reaction, which is an aerobic microorganism treatment reaction, proceeds. As the nitrification reaction proceeds, the pH of the treated water drops. The pH value, ORP, and DO of the treated water are measured by the treated water quality measurement devices 6, and the circulation amount of the waste water or treated water is determined on the basis of these values. Specifically, the treated water is circulated while regulating the air injection amount and the like so as to maintain the ORP at +10 mV or above in the aerobic reaction treatment tank where the nitrification reaction takes place, and at −10 mV or below in the anaerobic reaction treatment tank where the denitrification reaction takes place. Control of the circulation amount can be readily performed without the use of a circulating pump or the like, through control of the air amount and/or of the circulation rate control device. For this reason, the waste water treatment method of the present invention represents an energy-saving waste water treatment method. Of the equipment, including the bioreactor, of the present invention, each microorganism reaction unit can be regulated in respective fashion, with control thereof being programmed in advance, making unmanned automated operation easy, and affording the feature of a labor-saving plant.

With the circulation rate controlled by the circulation rate control device 4, a portion of the activated sludge and the treated water discharged from the top part of the cylindrical top part 3c flows down the conical trapezoidal peripheral face having a 45 degree slope angle. The outflowing activated sludge and the treated water pass through a sludge concentration part 5b formed by the sloped face and the cylindrical control plate 5 situated in proximity to the sloped face of the conical trapezoidal peripheral face, thereby making possible rapid forcible sedimentation of the activated sludge. The purified treated water and the activated sludge are readily separated, and the separated treated water is released through the treated water release port 11.

The activated sludge having undergone rapid forcible sedimentation accumulates as the activated sludge becomes concentrated between the outer tank inner face and the inner tank outside peripheral face. This accumulated activated sludge, while mixing with the treated water, moves to the anaerobic microorganism treatment reaction part, and circulates through the bioreactor.

According to the waste water treatment method of the present invention, the activated sludge is circulated within the anaerobic and aerobic tanks at a circulation rate of 3-20 while being concentrated, whereby fluctuations in the waste water load can be readily accommodated. Because the circulation rate is maintained in this range, the activated sludge becomes acclimated, becoming activated sludge that is optimal for water treatment. Under these conditions, the pH in the aerobic treatment tank is the range 4.5-8.5, and preferably 5.5-7.5.

In the bioreactors, irrespective of low BOD load of the waste water, in cases of high nitrogen concentration, it is preferable to add to the anaerobic reaction process part a denitrification bacteria nutrient composed of an organic substance such as a proton donor or the like, for example methanol. In such cases, as the pH of the treated water tends to rise, it is preferable to also add a mineral acid such as hydrochloric acid or the like.

The waste water treatment method of the present invention may employ a single bioreactor, or a plurality of tanks. In this case, release water from the first tank is introduced into the waste water supply port of the second tank. In a case in which, for example, two bioreactors are linked in series, waste water treatment can be performed more effectively by adopting a ratio of the capacity of the nitrification reaction part and the capacity of the denitrification reaction part in the second tank that is different from this ratio in the first tank. Specifically, denitrification-dephosphorization can be performed by setting this capacity ratio to one smaller than that in the first tank.

By situating the bioreactor in the waste water treatment step, (1) anaerobic-aerobic operation can take place while minimizing the production of toxic gases, thereby improving the autodigestion capability of the activated sludge microbes; and (2) microbes capable of selectively decomposing contaminant substances in waste water as a selective culture tank become acclimated, so that persistent substances can be readily treated.

Step 6:

Step 6 is a step in which the treated waste water 2 separated from the dilute activated sludge aeration tank is supplied to the sedimentation tank. The sludge contained in the treated waste water 2 sediments in the sedimentation tank, and the clear supernatant is released as release water.

The method for upgrading existing waste water treatment equipment according to the present invention is a method for retrofitting existing water treatment equipment with the above described bioreactor. By retrofitting the bioreactor and circulating sludge through the bioreactor, the amount of sludge produced by existing water treatment equipment, particularly that installed at a food production facility, can be brought substantially to zero. Therefore, the need for sludge collection tanks and dewatering devices, which occupy a major part of existing water treatment equipment, is obviated, and the installation area for the water treatment equipment can be smaller.

EXAMPLES

Example 1

Wastewater discharged from a food production facility was treated by the method shown in FIG. 1.

Prior to treatment, the waste water had a BOD of 800 mg/L, a chemical oxygen demand (hereinafter "COD") of 300 mg/L, a T-N of 50 mg/L, a normal hexane-extracted oil component concentration (hereinafter "n-Hex") of 50 mg/L, and a suspended solids concentration (hereinafter "SS") of 200 mg/L, the amount of treated water being 1,500 m$^3$/day. In the past, the waste water underwent waste water treatment by the method shown in FIG. 4, producing 150 tons/month of dewatered cake.

The capacity of the waste water aeration-conditioning tank was 1,500 m$^3$, the capacity of the pressurized flotation concentration-separation tank was 250 m$^3$, the capacity of the dilute activated sludge aeration tank was 1,500 m$^3$, and the capacity of the sedimentation tank was 800 m$^3$.

The bioreactor had an anaerobic treatment tank of 80 m$^3$ capacity, and an anaerobic treatment tank of 250 m$^3$ capacity. The treated water was circulated within the bioreactor at a circulation rate in the range of 3-6.

Sludge produced in the sedimentation tank was added continuously by a metering pump to the interior of the waste water aeration-conditioning tank. The added amount was supplied at a rate such that the sludge concentration within the waste water aeration-conditioning tank, expressed as MLSS, was in the range of 1,500-2,000 mg/L. The amount of aeration was adjusted to regulate the ORP to +50 mV.

The treated waste water having undergone aeration-conditioning in the waste water aeration-conditioning tank to bring the ORP to a positive value was supplied to a KF800 non-dosing type pressurized flotation concentration-separation tank (made by Japan ALSI Co. Ltd.). In this pressurized flotation concentration-separation tank, a mixture of 100 weight parts of 5 Kg/cm$^2$ pressurized water per 100 weight parts of treated waste water was circulated, without chemical dosing.

The sludge separated by the pressurized flotation concentration-separation tank underwent return treatment to the bioreactor. In the bioreactor, in the anaerobic treatment tank, the pH was 7.1, the ORP was −350 mV, and the DO was 0; in the aerobic treatment tank, the pH was 6.1, the ORP was +210 mV, and the DO was 0.8 mg/L.

The excess sludge produced in the bioreactor was supplied to the dilute activated sludge aeration tank. The release water from the bioreactor was supplied to a full-capacity dilute activated sludge aeration tank.

The treated waste water obtained from the pressurized flotation concentration-separation tank was sent to the dilute activated sludge aeration tank and treated. The dilute activated sludge aeration tank was supplied with the excess sludge produced in the bioreactor. In the dilute activated sludge aeration tank, the excess sludge was acclimated to activated sludge suitable for treated waste water.

The treated waste water treated in the dilute activated sludge aeration tank was released after passing through the sedimentation tank. The sludge sedimented in the sedimentation tank was recirculated to the waste water aeration-conditioning tank. Through these sludge circulation steps, reductions in the amount of sludge were achieved.

The water quality of the release water was a BOD of 8 mg/L, a COD of 10 mg/L, a T-N of 0 mg/L, an n-Hex of 0 mg/L, and an SS of 1 mg/L.

Production of dewatered cake was 0-20 tons/month.

During waste water treatment by the above described method, because anaerobic-aerobic operation can take place while minimizing the production of toxic gases in the bioreactor, the autodigestion capability of the microbes is improved. Moreover, in the course of circulation of the sludge, microbes capable of selectively decomposing contaminant substances in the waste water become acclimated, so that persistent contaminant substances can be readily treated. As a result, effects such as (1) dramatic reductions in the discharged amount of dewatered cake, (2) elimination of foul odors in proximity to the pressurized flotation concentration-separation tank, and the like were observed.

Example 2

Wastewater discharged from a confection production facility was treated.

Prior to treatment, the waste water had a BOD of 6,000 mg/L, a COD 3,500 mg/L, a T-N of 120 mg/L, an n-Hex of 3,000 mg/L, and an SS of 350 mg/L, the amount of treated water being 120 m$^3$/day. At this facility, after adding an inorganic flocculant such as polyaluminum chloride to the pressurized flotation tank to bring about flocculation and sedimentation, conventional waste water treatment was conducted by the method shown in FIG. 4. For this reason, dewatered cake (water content 85 wt %) was produced as a rate of 150 tons/month.

Figure 4:
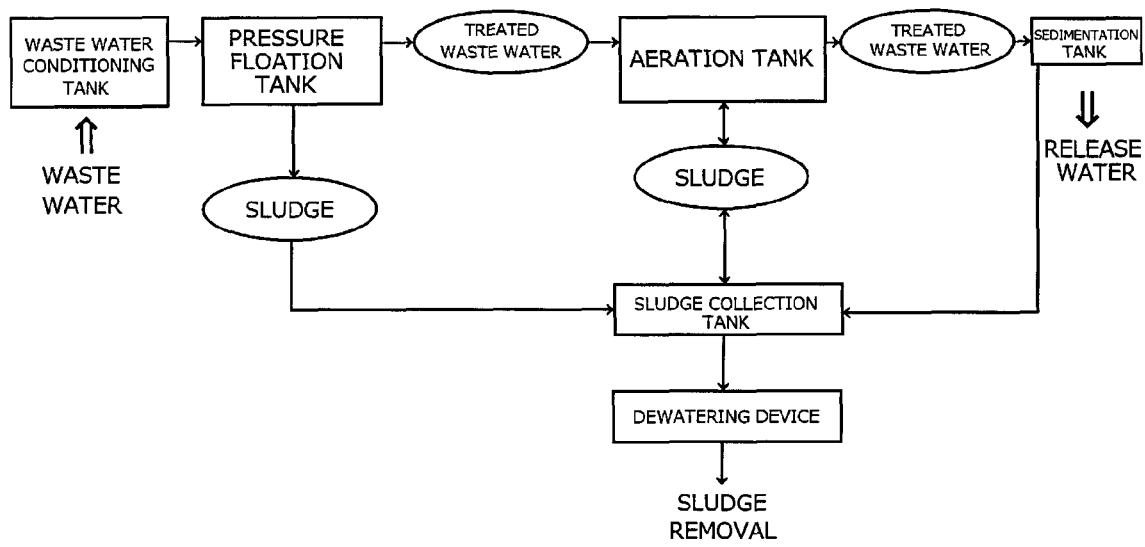
FIG. 4 is a block diagram of an existing activated sludge treatment method.

The sludge collection tank and dewatering device shown in FIG. 4 were removed, and in a portion of the removal site was installed a bioreactor shown in FIG. 2, having an anaerobic treatment tank of 100 m$^3$ capacity, and an aerobic treatment tank of 250 m$^3$ capacity. The treated waste water was circulated within the bioreactor at a circulation rate in the range of 5-8.

An aeration device was attached to the conventional waste water conditioning tank shown in FIG. 4, to convert it to a waste water aeration-conditioning tank. The conventional aeration tank, redeployed as a dilute activated sludge aeration tank, and the sedimentation tank, redeployed as a sedimentation tank, were respectively attached to the sludge circulation pathway shown in FIG. 1.

At this facility, the capacity of the waste water aeration-conditioning tank was 100 m$^3$, the capacity of the pressurized flotation concentration-separation tank was 10 m$^3$, the capacity of the dilute activated sludge aeration tank was 120 m$^3$, and the capacity of the sedimentation tank was 30 m$^3$.

The sludge produced in the sedimentation tank was continuously added into the waste water aeration-conditioning tank by a metering pump. The added amount was supplied at a rate such that the sludge concentration within the waste water aeration-conditioning tank, expressed as MLSS, was in the range of 3,500-5,000 mg/L. The amount of aeration was adjusted to regulate the ORP to +100 mV.

The treated waste water having undergone aeration-conditioning in the waste water aeration-conditioning tank to bring the ORP to a positive value was supplied to a KF800 non-dosing type pressurized flotation concentration-separation tank (made by Japan ALSI Co. Ltd.). In this pressurized flotation concentration-separation tank, a mixture of 220 weight parts of 4.5 Kg/cm$^2$ pressurized water per 100 weight parts of treated waste water was circulated, without chemical dosing.

The sludge separated by the pressurized flotation concentration-separation tank underwent return treatment to the bioreactor. In the bioreactor, in the anaerobic treatment tank, the pH was 7.4, the ORP was −400 mV, and the DO was 0; in the aerobic treatment tank, the pH was 7.8, the ORP was +210 mV, and the DO was 1.8 mg/L.

The excess sludge and release water produced in the bioreactor was supplied to the dilute activated sludge aeration tank.

The treated waste water obtained from the pressurized flotation concentration-separation tank was sent to the dilute activated sludge aeration tank and treated in the same manner as in Example 1, the treated water being released after passing through the sedimentation tank. The sludge sedimented in the sedimentation tank was recirculated to the waste water aeration-conditioning tank.

The water quality of the release water was a BOD of 18 mg/L, a COD of 30 mg/L, a T-N of 1 mg/L, an n-Hex of 1 mg/L, and an SS of 30 mg/L.

Production of dewatered cake was 0 tons/month.

In the confection production facility as well, effects such as (1) dramatic reductions in the discharged amount of dewatered cake, (2) elimination of foul odors in proximity to the pressurized flotation concentration-separation tank, and the like were observed.

INDUSTRIAL APPLICABILITY

The method of the present invention discharges substantially no excess sludge, thereby affording an environmentally-friendly wastewater treatment method having minimal environmental impact; and moreover requires no equipment for dewatered cake treatment, and therefore can be utilized going forward as a method to upgrade numerous existing waste water treatment equipment. In particular, facilities located in urban areas typically require odor abatement equipment to deal with copious foul odors produced by waste water conditioning tanks, pretreatment equipment, and dewatering treatment equipment. However, by introducing the present treatment method, no foul odors are produced in the treatment steps leading from the waste water conditioning tank for waste water treatment, to final treatment. For this reason, the present treatment method represents a treatment method suited to abatement of foul odors by minimizing the production of foul odors associated with treatment, in some cases rendering odor abatement equipment unnecessary.

EXPLANATION OF REFERENCE SYMBOLS AND NUMERALS

1 Bioreactor
2 Outer tank
3 Cylindrical inner tank
4 Circulation rate control device
5 Cylindrical control plate
6 Treated water quality measurement device
7 Rotating shaft
8 Air injection port
9 Support post
10 Waste water supply port
11 Treated water release port
12 Sedimentation-solidification prevention device
13 Sludge extraction port

The invention claimed is:

1. An activated sludge treatment method for treatment of wastewater by a circulation system equipped with a waste water aeration-conditioning tank, a pressurized flotation concentration-separation tank, a dilute activated sludge aeration tank, a bioreactor, and a sedimentation tank, sludge being circulated among the tanks, wherein the activated sludge treatment method is characterized by comprising:
a step 1 in which sludge 2 produced in the sedimentation tank is supplied to the waste water aeration-conditioning tank supplied with waste water prior to treatment;
a step 2 in which waste water into which the sludge 2 has been mixed is subjected to aeration-conditioning in the waste water aeration-conditioning tank, to bring the oxidation-reduction potential to a positive value, and the conditioned waste water is then supplied to the pressurized flotation concentration-separation tank;
a step 3 in which the sludge 1 produced through treatment in the pressurized flotation concentration-separation tank is supplied to the bioreactor;
a step 4 in which the treated waste water 1 separated from the pressurized flotation concentration-separation tank is supplied to the dilute activated sludge aeration tank;
a step 5 in which released water and the sludge 3 produced by treatment in the bioreactor are supplied to the dilute activated sludge aeration tank; and
a step 6 in which the treated waste water 2 separated from the dilute activated sludge aeration tank is supplied to the sedimentation tank
wherein the bioreactor is equipped with an outer tank; a cylindrical inner tank situated in the interior of the outer tank and having openings at top and bottom; a circulation rate control device provided in an upper part of the cylindrical inner tank, and adapted for controlling the rate of circulation of treated water inside the tank; a cylindrical control plate provided to the outside perimeter in an upper part of the cylindrical inner tank, and adapted for inducing sedimentation of the sludge; treated water quality measurement devices provided outside and inside the cylindrical inner tank; a waste water supply port provided to a circulation pathway of the treated water circulated within the outer tank and the inner tank; and a treated water release port provided to an upper part of the outer tank;
the cylindrical inner tank being divided, by a partitioning wall having a passage hole in a center part, into a cylindrical top part and a cylindrical bottom part, the cylindrical top part constituting an aerobic microorganism treatment tank having a conical trapezoidal apical part open at the top face and the bottom face and provided with a plurality of air injection ports in a peripheral edge part of the partitioning wall and surrounding the passage hole within the cylindrical top part, and the cylindrical bottom part constituting an anaerobic microorganism treatment tank having an open part at the bottom face;
the bioreactor being provided with stirring devices for stirring the aerobic microorganism treatment tank and the anaerobic microorganism treatment tank;
and provided with means for detecting at least one measured value selected from the hydrogen ion concentration, the oxidation-reduction potential, and the dissolved oxygen content of the treated water measured by the treated water quality measurement devices, and with means provided to the circulation rate control device according to the detected measured value, and adapted for controlling the rate at which water circulates within the tank to 3-20, through control of at least one quantity selected from opening-closing of a fluid level adjustment valve, vertical movement of a fluid level adjustment control panel, and the quantity of air blown in from the air injection ports;

wherein anaerobic microorganism treatment and aerobic microorganism treatment take place in successive fashion through circulation of activated sludge, together with waste water supplied from the waste water supply port, within the tank, through the interior of the cylindrical inner tank, the outside peripheral face of the cylindrical inner tank, and within activated sludge that has sedimented to a bottom part of the outer tank.

2. The activated sludge treatment method according to claim 1, characterized in that the sludge 2 supplied to the waste water aeration-conditioning tank is supplied in a range such that the sludge concentration within the waste water aeration-conditioning tank, expressed as the mixed liquor suspended solids is 500-8,000 mg/L.

3. A method for upgrading existing waste water treatment equipment to reduce the amount of sludge produced by waste water treatment equipment, to a lower level than the amount of sludge produced by the existing waste water treatment equipment, wherein the method for upgrading existing waste water treatment equipment is characterized by comprising:

a step in which the bioreactor according to claim 1 is newly equipped with both an existing or upgraded pressurized flotation concentration-separation tank and an existing or upgraded dilute activated sludge aeration tank to form a newly equipped bioreactor; and a circulation step in which sludge is circulated via the newly equipped bioreactor.

* * * * *